United States Patent [19]

Collins et al.

[11] 4,042,476

[45] Aug. 16, 1977

[54] POLYMERIZED TITANIUM DIOXIDE FOR ULTRAVIOLET COATINGS

[75] Inventors: George L. Collins, Murray Hill; John R. Costanza, North Plainfield, both of N.J.

[73] Assignee: Celanese Corporation, New York, N.Y.

[21] Appl. No.: 550,383

[22] Filed: Feb. 18, 1975

[51] Int. Cl.$^2$ .................... C08F 8/00; C08L 7/00; B01J 1/10
[52] U.S. Cl. .................... 204/159.15; 204/159.12; 204/159.13; 204/159.16; 204/159.17; 204/160.1
[58] Field of Search .................... 260/42.53, 42.14; 204/159.16, 159.12, 159.13, 159.15, 159.17, 160.1; 427/54

[56] References Cited

U.S. PATENT DOCUMENTS

| | | | |
|---|---|---|---|
| 3,393,165 | 7/1968 | Evans et al. | 260/42.53 |
| 3,759,807 | 9/1973 | Osborn et al. | 204/159.23 |
| 3,827,958 | 8/1974 | McGinniss | 204/159.23 |
| 3,884,871 | 5/1975 | Herman et al. | 260/42.53 |
| 3,887,450 | 6/1975 | Gilano et al. | 204/159.16 |

*Primary Examiner*—Murray Tillman
*Assistant Examiner*—Thurman K. Page

[57] ABSTRACT

There is disclosed a process for utilizing titanium dioxide pigments in ultraviolet coating compositions. Basically, the process involves forming a vinyl aqueous emulsion in the presence of titanium dioxide pigments; precipitating and drying the titanium dioxide-polymeric emulsion and adding the dried precipitate as pigment to an ultraviolet curable coating composition.

9 Claims, No Drawings

POLYMERIZED TITANIUM DIOXIDE FOR ULTRAVIOLET COATINGS

BACKGROUND OF INVENTION

This invention relates to ultraviolet curable coating compositions and methods for making same. More particularly, this invention relates to a process for rendering titanium dioxide useful in ultraviolet curable coatings applications.

Heretofore, the use of titanium dioxide in ultraviolet curing systems has been largely prohibited, apparently because of the ultraviolet reflective nature of titanium dioxide pigments. See, for example, U.S. Pat. No. 3,632,527, which discloses one method of modifying titanium dioxide pigments to allow their use in certain actinic light systems.

When titanium dioxide pigments have been incorporated into ultraviolet curing coatings, exposure of the coatings to radiation under standard conditions has resulted in coatings with deficient cure properties. In particular, the coatings lack adhesion and chemical resistance of all types.

U.S. Pat. No. 3,048,530 discloses the preparation of vinyl acetate emulsions in the presence of titanium dioxide, utilizing ultraviolet light to enhance cure rates. However, there is no disclosure of the use of the resulting product in ultraviolet curable coatings compositions.

It is an object of this invention to prepare titanium dioxide pigment systems which may be utilized in ultraviolet curable coatings applications.

It is another object of this invention to prepare ultraviolet curable titanium dioxide-based coating compositions which have improved adhesion and cure properties when compared to the prior art titanium dioxide-based systems.

These and other objectives are obtained by preparing the compositions of the instant invention.

SUMMARY OF INVENTION

Basically, the instant invention involves a two-step process. The first step involves copolymerizing alpha beta ethylenically unsaturated vinyl polymerizable monomers in the presence of titanium dioxide. After the polymer dispersion has been formed, it is precipitated out of the water by the addition of an organic solvent and the precipitate utilized as a means of incorporating titanium dioxide into an ultraviolet polymerizable coating composition. The titanium dioxide is utilized in the dispersion at up to about the 20 percent, by weight, level, based upon the total emulsion-titanium dioxide solids. The titanium dioxide-polymer is added to the ultraviolet curable compositions of this invention at levels in a ratio of polymer-titanium dioxide to curable composition of about 2-1 to 1-5.

DESCRIPTION OF INVENTION

The titanium dioxide which is useful in this invention is of any type which is normally utilized in coatings and includes either anatase or rutile titanium dioxide as well as coated and uncoated titanium dioxides and titanium dioxide pigments which have been surface modified. The only requirement is that the titanium dioxide be in the particle size range of about 0.05 to about 10 microns, preferably about 0.1 to about 0.5 microns. The titanium dioxide is utilized in the dispersion at up to about the 20 percent, by weight, level, based on the solids of the formed polymer dispersion, preferably about 3 to about 10 percent.

The titanium dioxide-polymer emulsion may be prepared by any one of several methods. For example, titanium dioxide may be added to a reaction flask along with water, and the vinyl polymerizable monomers described hereinafter may be introduced into the flask over from one hour to five hours or more, at elevated temperatures ranging from about 100°–250° F., in combination with the polymerization initiators. In the alternative, the monomers, water, and the titanium dioxide may be concomitantly mixed in the flask and the initiator added over a period of time under heat. Alternatively, and most preferably, the titanium dioxide is dispersed in the monomers and added to the reactor over a period of time ranging from about one hour up to five hours or more, with continuous vigorous agitation. Preferably, the initiator system should be added over a similar time period.

Basically, any type of alpha beta ethylenically unsaturated vinyl polymerizable monomer which is not interferingly reactive, when copolymerized, with the ultraviolet curing mechanism or with titanium dioxide may be utilized.

The monomers which are useful in forming the titanium dioxide-polymer colloidial emulsion include acrylates or methacrylates having the general formula:

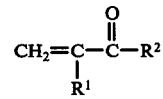

wherein $R^1$ is hydrogen or methyl, $R^2$ is OH, $N(R^3)_2$ or $OR^4$, wherein $R^3$ is $C_1$–$C_6$ alkyl or hydrogen, and wherein each $R^3$ substituent may be the same or different, and wherein $R^4$ is $C_1$–$C_{10}$ alkyl, aryl or hydroxy alkyl. The typical monomers falling within this description include, among others: methylacrylate, ethylacrylate, propyl acrylate, n-butyl acrylate, isobutyl acrylate, 2-ethylhexyl acrylate, hydroxyethyl acrylate, hydroxypropyl acrylate, methyl methacrylate, ethyl methacrylate, isobutyl methacrylate, 2-ethylhexyl methacrylate, lauryl methacrylate, hydroxyethyl methacrylate, hydroxypropyl methacrylate, etc. Also may be included the amides, such as acrylamine, methacrylamine, and the like. In addition, the amides may be reacted with an aldehyde such as formaldehyde, to produce materials such as n-methylolacrylamide. n-methylolmethacrylamide, alkylated n-methylolacrylamides and n-methylolmethacrylamides, such as n-methoxymethylacrylamide, n-methoxymethylmethacrylamide, and the like.

Derivatives of the hypothetical vinyl alcohol, e.g., aliphatic vinyl esters such as vinyl formate, vinyl acetate, vinyl propionate, vinyl butyrate, vinyl isobutyrate, vinyl valerate, vinyl caproate, and the vinyl ester of versatic acid can be employed, as can allyl esters of saturated (which includes polymerizably non-reactive unsaturation) monocarboxylic acids., e.g., allyl acetate, allyl propionate, and allyl lactate, with the latter esters generally being used in relatively small amounts together with larger amounts of one or more different vinyl monomers, and especially aliphatic vinyl esters such as vinyl acetate.

Aliphatic vinyl ethers such as methyl vinyl ether, ethyl vinyl ether and n-butyl vinyl ether can also be employed, as can vinyl ketones, such as methyl vinyl ketone, and isobutyl vinyl ketone, and dialkyl esters of monoethylenically unsaturated dicarboxylic acids., e.g., diethyl maleate, dibutyl maleate, dioctyl maleate, diisooctyl maleate, dinonyl maleate, diisododecyl maleate, ditridecyl maleate, dipropyl fumarate, dibutyl fumarate, dioctyl fumarate, diisooctyl fumarate, didecyl fumarate, dibutyl itaconate and dioctyl itaconate.

Additional comonomers include vinyl aromatic compounds, such as styrene, vinyl toluene, alpha methyl styrene, and the like, as well as nitriles and the unsubstituted amides and substituted (including N-substituted) amides of polymerizable ethylenically unsaturated mono- and polycarboxylic acids.

Amino monomers which can be used include substituted and unsubstituted aminoalkyl acrylates and methacrylates such as aminomethylacrylate, betaaminoethylacrylate, aminomethylmethacrylate, betaaminoethylmethacrylate, dimethylaminomethylacrylate, beta-dimethylaminoethylacrylate, dimethylaminoethylmethacrylate, beta-dimethylaminomethylmethacrylate, tertiary butyl aminoethyl methacrylate and the like.

Another monomer useful in the instant invention is a polymerizable alpha beta ethylenically unsaturated carboxylic acid, such as ethacrylic acid, crotonic acid, monoethylenically unsaturated dicarboxylic acids, such as maleic acid, fumaric acid, itaconic acid and citraconic acid, and the half esters of these acids, such as methyl hydrogen fumarate, benzyl hydrogen maleate, butyl hydrogen maleate, octyl hydrogen itaconate and dodecyl hydrogen citraconate, i.e., half esters wherein the reacted alcohol portion contains 1 to about 20 carbon atoms; and monoethylenically unsaturated tricarboxylic acids, such as aconitic acid. Such acids include the halogen substituted (e.g., fluoro-, chloro-, and bromo-substituted) derivatives, e.g., alpha chloro-acrylic acid, and the anhydrides of these acids, if available, e.g., maleic anhydride and citraconic anhydride.

The most preferred monomers for use herein are the $C_1-C_5$ acrylate or methacrylate esters or vinyl acetate.

While it is not required in this invention, stabilizing surfactants may also be employed. These materials are also termed emulsifying agents, dispersing agents or wetting agents, and may be anionic, non-ionic or cationic types, or mixtures thereof, except that cationic and anionic surfactants may not be mixed.

Among the non-ionic surfactants which can be used are polyethers, e.g., ethylene oxide and propylene oxide condensates in general, which include straight and branched-chain alkyl and alkylaryl polyethylene glycol and polypropylene glycol ethers and thioethers, and more particularly substances such as the members of a homologous series of alkylphenoxypoly(ethyleneoxy)ethanols, which series can be represented by the general formula:

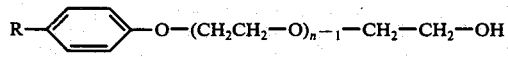

wherein R represents an alkyl radical and n represents the number of moles of ethylene oxide employed, included among which are alkylphenoxypoly(ethyleneoxy) ethanols having alkyl groups containing from about 7 to about 18 carbon atoms, inclusive, and having from about 4 to about 240 ethyleneoxy units, such as the heptylphenoxypoly(ethyleneoxy)ethanols, nonylphenoxypoly(ethyleneoxy)ethanols and dodecylphenoxypoly(ethyleneoxy)ethanols; the polyoxyalkylene derivatives of hexitol (including sorbitans, sorbides, mannitans and mannides) anhydride partial long chain fatty acid esters, such as the polyoxyalkylene derivatives of sorbitan monolaurate, sorbitan monopalmitate, sorbitan monostearate, sorbitan tristearate, sorbitan monoleate and sorbitan trioleate; the condensates of ethylene oxide with a hydrophobic base, said base being formed by condensing propylene oxide with propylene glycol; sulfur-containing condensates, e.g., those prepared by condensing ethylene oxide with higher alkyl mercaptans, such as nonyl, dodecyl or tetradecyl mercaptan, or with alkylthiophenols wherein the alkyl group contains from 6 to 15 carbon atoms; ethylene oxide derivatives of long-chain carboxylic acids, such as lauric, myristic, palmitic or oleic acid, or mixtures of acids, such as tall oil, and ethylene oxide derivatives of long-chain alcohols such as octyl, decyl, lauryl or cetyl alcohols.

Among the anionic surfactants which can be used are the higher molecular weight sulfates and sulfonates, e.g., sodium and potassium alkyl, aryl and alkylaryl sulfates and sulfonates such as sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene sulfonate, and sodium xylene sulfonate; higher fatty alcohols, e.g., stearyl, lauryl, etc., which has been ethoxylated and sulfonated, dialkyl esters of alkali metal sulfosuccinic acid salts, such as sodium diamyl sulfosuccinate, sodium dihexyl sulfosuccinate and sodium dioctyl sulfosuccinate, and formaldehyde-naphthalenesulfonic acid condensation products.

Cationic surfactants generally include any type of amine which has been salted with an organic or inorganic acid including the sulfonic, carboxylic and mineral acids. The preferred amines contain at least 6, preferably at least 12, carbon atoms per molecule. Included are benzyl amine, benzyl trimethyl amine, and fatty amines such as lauryl amine.

The amount of surfactant which can be employed can range up to about 10 percent, by weight, based on the vinyl polymerizable monomer utilized. Increased amounts of surfactant tend to reduce the chemical resistance of films.

Small amounts (less than about five percent, by weight, based on the vinyl polymerizable monomers) of one or more protective colloids, particularly when a reflux-type polymerization is carried out using vinyl acetate or the like as part of the monomer charge, can be employed. Included among such materials are ether linkage-containing protective colloids, such as hydroxymethyl cellulose, hydroxyethyl cellulose, ethylhydroxyethyl cellulose, carboxymethyl cellulose, ethoxylated starch derivatives, and the like. However, other protective colloid-forming substances, i.e., ones containing no ether linkages, can also be used, either alone, or together with the aforementioned ether linkage-containing materials, and included among these are partially and fully hydrolyzed polyvinyl alcohols, polyacrylic acid, sodium and other alkali metal polyacrylates, polyacrylamide, poly(methyl vinyl ether/maleic anhydride), polyvinylpyrrolidone, water-soluble starch, glue, gelatin, water soluble alginates, such as sodium or potassium alginate, casein, agar, and natural and synthetic gums, such as gum arabic and gum tragacanth.

The dispersions prepared herein may be prepared using many of the various well known prior art emulsion polymerization methods. For example, the monomers of the invention may be pre-emulsified (with or without the titanium dioxide) utilizing a portion of the above-described surfactants into one or more than one pre-emulsion, and the emulsion subsequently added to the reactor either in bulk or over a period of time during the course of the reaction. Conversely, the monomers may be fed directly into the reactor in either single or multiple feeds, either pre-dispersed or subsequently mixed with the initiators or the titanium dioxide described hereinafter. The dispersion is formed as polymerization occurs. Bulk emulsification and polymerization are also contemplated herein.

The temperature utilized in carrying out the emulsion polymerization of this invention will depend to a large extent upon the initiator which has been chosen, but generally reaction temperatures will range from about room temperature up to about 250° F. or somewhat above, and can be varied as the final polymerization proceeds to substantial completion. Subatmospheric, atmospheric or super-atmospheric pressures can be employed during all or part of polymerization and depending upon the monomers and catalysts employed, the reaction can be carried out if desired under an inert atmosphere, such as nitrogen or carbon dioxide.

The monomer or monomers will be polymerized in the presence of the titanium dioxide by means of a catalytic amount of a conventional free radical polymerization catalyst or catalyst system (which can also be referred to as an addition polymerization catalyst, a vinyl polymerization catalyst, or a polymerization initiator), preferably, although not necessarily, one which is substantially water soluble. Among such catalysts are organic peroxides, such as hydrogen peroxide, alkali metal (e.g., sodium, potassium or lithium) and ammonium persulfates, perphosphates and perborates, azonitriles, such as $\alpha,\alpha$-azobisisobutyronitrile, and redox systems, including such combinations as mixtures of hydrogen peroxide, t-butyl hydroperoxide, or the like, and any of an iron salt, a titanous salt, zinc formaldehyde sulfoxylate, or sodium formaldehyde sulfoxylate; an alkali metal or ammonium persulfate, borate or perchloriate, together with an alkali metal bisulfite such as sodium metabisulfite; an alkali metal persulfate together with an arylphosphinic acid such as benzenephosphinic acid, and the like.

In accordance with the customary practice of the art, the amount of polymerization catalyst employed will be no more than that required to obtain substantially complete monomer conversion at lowest catalyst cost.

It is also possible, when using redox catalyst systems, to dissolve the oxidant, e.g., ammonium persulfate, in the surfactant-water mixture prior to the preparation of the monomer pre-emulsion, and to then add the reductant, together with the oxidant-containing monomer pre-emulsion, to the water in which it will be polymerized.

The amount of water to which the monomers are added will be determined by the solids content desired in the finished polymer dispersion. The solids content can range from as low as 20 percent to as high as 80 or higher, by weight.

As previously stated, the dispersion prepared herein may be prepared using many of the various well known prior art emulsion polymerization techniques, and as previously stated, the titanium dioxide pigment may be added either to the reaction flask or to the monomers, but preferably is dispersed in the monomers and added to the reaction in that fashion over the monomer addition period.

After the dispersion has been prepared, as described above, it is precipitated out of its aqueous medium by several methods, i.e., generally involving the addition of a precipitating agent to the dispersion. After the agent is added, the dispersion is broken, forming a precipitate and an aqueous layer which is then decanted. The precipitate can then be washed and the resulting polymeric titanium dioxide dried by vacuum, heatdrier, freeze drying, or centrifugation. The precipitating agents are generally low boiling organic solvents, such as the $C_1$–$C_5$ alcohols and hydrocarbon fractions, having a boiling point of less than about 70° C., which are non-solvents for the precipitate. Examples of the solvents include the naphthas, mineral spirits, ketones, esters, ethers, mixed ether-esters and alcohols.

In a preferred process an alcohol, such as propanol, is added to the dispersion in amounts up to about 80 percent, by weight, based on the aqueous non-solids. The emulsion is then allowed to stand overnight and the water and alcohol mixture decanted. The polymeric titanium dioxide which remains behind is then dried and further utilized as discussed hereinafter.

It is theorized that the process employed herein acts to coat the titanium dioxide with a polymeric layer of the alpha beta ethylenically unsaturated vinyl polymerizable monomers. It is thought that this acts to reduce shrinkage of the coating as it cures.

The polymeric titanium dioxide may be added to the ultraviolet curable systems as described hereinafter in a pigment-to-binder ratio ranging from about 2–1 to about 1–5, by weight, or even higher.

The titanium dioxide may simply be blended into the ultraviolet curable systems described hereinafter, but more preferably it is ground into the compositions by the use of an appropriate type of grinder, homogenizer, pebble ball mill, steel ball mill, or other type of commonly known paint grinding apparatus, until a uniform dispersion is obtained.

The ultraviolet curable compositions of the instant invention contain from about 40 to about 100 percent, by weight, based upon the total ultraviolet curable composition, excluding the polymerized titanium dioxide, inert fillers, and the like, of an alpha beta ethylenically unsaturated vinyl polymerizable compound containing at least two vinyl polymerizable groups per molecule. Included are unsaturated esters of polyols and particularly such esters of the alpha methylene carboxylic acids, e.g., ethylene diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetra- acrylate and methacrylate, dipentaerythritol hexacrylate, tripentaerythritol octaacrylate, sorbitol hexacrylate, 1,3-propanediol diacrylate, 1,5-pentanediol dimethacrylate, hexanediol diacrylate, trimethylol propane and trimethylol ethane di- and triacrylate, the bisacrylates and methacrylates of polyethylene glycols of a molecular weight of 200–1500, and the like; unsaturated amides, particularly those of the alpha methylene carboxylic acids, and especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gamma-methacrylamidopropoxy)ethane, beta-methacrylamidoethyl methacrylate, N-beta-hydroxy-ethylbeta-(methacrylamido)-ethyl acrylate and N,N-bis-(beta-methacrylyloxyethyl)acrylamide; vinyl esters such as divinyl succinate, divinyl adipate, divinyl phthalate, divinyl terephthalate, divinyl benzene-1,3-disulfonate, and divinyl butane-1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamides wherein the molecular chain between the hydroxyl and amino groups is solely carbon or oxygen interrupted carbon.

The polyethylenic unsaturation can be present as a substituent attached to a preformed polymer resin, such as an alkyd, a polyester, a polyamide, or a vinyl homo- or copolymer. Also included are polymers containing maleic and fumaric acids or esters, as well as polymeric unsaturated materials prepared by reacting vinyl hydroxy or carboxy materials with polyepoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc.

In addition to the aforementioned polyfunctional polymerizable compounds, compounds containing a single polymerizable ethylenically unsaturated group of the structure

can also be utilized. In addition to traditional monomers, as described hereafter, the mono-unsaturated compounds may be polymeric materials, as previously described, containing on the average a single site of unsaturation on each polymer molecule. These monomers can be aliphatic, aromatic, cycloaliphatic or any variant thereof. Among the monomers are included styrene, 4-methylstyrene, alphamethylstyrene, and the like; acrylic acid and its nitrile, amide and $C_1$–$C_{12}$ alkyl, aryl, or hydroxy alkyl derivatives, such as acrylonitrile, ethylacrylate, 2-ethylhexyl acrylate, butoxyethoxyethyl acrylate, hydroxyethyl acrylate, as well as others. The vinyl halides, such as vinyl chloride, vinylidene chloride, and the like; vinyl ketones such as vinyl phenyl ketone, vinyl methyl ketone, alphachlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultraviolet curing mechanism may be utilized, and as such, these monomers are well known in the art.

These compounds may be added in amounts up to about 60 percent, by weight, based on the total curable composition, preferably about 10 to about 30 percent.

The instant invention can also contain up to about 60 percent, by weight, based upon the total curable system, excluding titanium dioxide, and inerts, of a polymeric material containing no polymerizable unsaturation. Among the polymers are the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers, and the like.

Illustrative of these polymers are the acrylic polymers as poly(acrylic acid), poly(methyl acrylate), poly(ethyl acrylate), poly(methacrylic acid), poly(methyl methacrylate), poly(ethyl methacrylate); poly(vinyl chloride); poly(ethylene/propylene/5-ethylidenebicyclo[2.2.1]-hep-2-ene; polyethylene, polypropylene; synthetic rubbers, e.g., butadiene/acrylonitrile copolymers and chloro-2-butadiene 1,3 polymers, the polyesters, copolyesters, polyamides and copolyamides, such as polycaprolactone, poly(caprolactone/vinyl chloride), poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(glutaraldehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymers using ethylene glycol, glycerol, sucrose, etc., as the starter; vinylidene polymers and copolymers, e.g., vinylidene chloride/acrylonitrile; vinylidene chloride/methacrylate and vinylidene chloride/vinyl acetate copolymers; ethylene/vinyl acetate copolymers; the polyureas and polyurethanes, such as described in *Polyurethanes: Chemistry and Technology*, Volumes I and II, Sanders and Frisch, published by Interscience Publishers; the polycarbonates; polystyrenes; polyvinyl acetals, e.g., polyvinyl butyral, polyvinyl formal; the cellulose ethers, e.g., methylcellulose, ethyl cellulose, and benzyl cellulose; the cellulose esters, e.g., cellulose acetate, cellulose acetate succinate and cellulose acetate butyrate; as well as the natural and modified natural polymers such as gutta percha, cellulose, gelatin, starch, silk, wool, and the like; the siloxane polymers and copolymers; the formaldehyde polymers such as polyformaldehyde; formaldehyde resins such as phenol-formaldehyde, melamine-formaldehyde, urea-formaldehyde, aniline-formaldehyde and acetone-formaldehyde; phenolic resins and the like.

If desired, the photopolymerizable monomers can also contain immiscible polymeric or non-polymeric organic or inorganic fillers or reinforcing agents, e.g., the organophilic silicas, bentonites, silica, powdered glass, colloidal carbon, as well as various types of dyes and pigments, in addition to the polymerized titanium dioxide, in amounts varying with the desired properties of the photopolymerizable composition. The fillers are useful in improving the strength of the composition, reducing tack and, in addition, as coloring agents.

In order to sensitize the compositions of the instant invention to ultraviolet light, certain photosensitizers or initiators are utilized. These fall into many classes and include compounds such as benzoin derivatives, as disclosed in German Patent No. F52340IVC/396, acetophenone, propiophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, 3-methoxyxanthone, 3-iodo-7-methoxyxanthone, thioxanthones, chlorinated thioxanthones, and the like.

Also included are the acetophenone photosensitizers of the type described in U.S. Pat. No. 3,715,293, having the structure

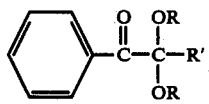

wherein R is alkyl of from 1-[carbon atoms, or aryl with 6 carbon atoms, and R' is hydrogen, alkyl of from 1-8 carbon atoms, aryl of from 6-14 carbon atoms or cycloalkyl of 5-8 carbon atoms.

The alkylphenone photosensitizers having the formula

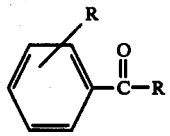

the benzophenone type photosensitizer having the formula

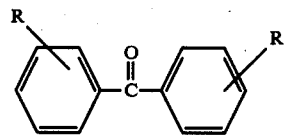

the tricyclic fused ring type having the formula

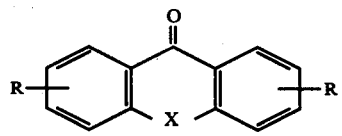

and the pyridyl type having the formula

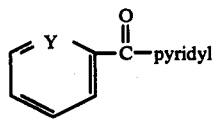

wherein the various substituents are as further described in U.S. Pat. No. 3,759,807.

Other photosensitizers include 1- and 2-chloroanthraquinone, 2-methylanthraquinone, 2-tertiary butyl anthraquinone, octamethylanthraquinone, 1-4-naphthoquinone, 9-10-phenanthrenequinone, 1,2-benzanthraquinone, 2-3-benzanthraquinone, 2-methyl 1,4-napthoquinone, 2-3-dichloronapthoquinone, 1-4-dimethylanthraquinone, 2-3-dimethylanthraquinone, 2-phenylanthraquinone, 2-3-diphenylanthraquinone, sodium salts of anthraquinone and the like. Other photoinitiators which are also useful are described in U.S. Pat. No. 2,760,863 and include vicinal ketaldonyl compounds, such as diacetyl benzyl, etc.; alpha ketaldonyl alcohols, such as benzoin, pivaloin, etc.; acryloin ethers, e.g., benzoin methyl and ethyl ethers, etc.; and alpha hydrocarbon substituted aromatic acryloins, including alphamethyl benzoin, alphaallyl benzoin, and alpha phenyl benzoin. Also included are the diacylhalomethanes, corresponding to one of the general formulas:

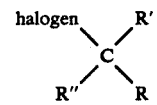

and

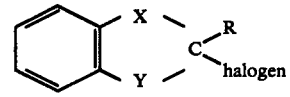

wherein halogen represents a halogen atom such as chlorine or bromine; R represents a hydrogen atom, a chlorine or bromine atom, or an acetyloxy group; R' and R" (same or different) represent a benzoyl group, a nitrobenzoyl group, a dimethylamino benzoyl group, a phenyl sulfonyl group, a carboxy phenyl sulfonyl group, a methylphenyl sulfonyl group, or a napthoyl group; and X and Y (same or different) represent a carbonyl group or a sulfonyl group. Included are 2-bromo-1,3 diphenyl-1,3 propane dione, 2,2-dibromo-1,3-indane dione, 2,2-dibromo-1,3-diphenyl-1,3-propane dione, 2-bromo-2-(phenylsulfonyl acetal phenone) and the like, as further described in U.S. Pat. No. 3,615,455.

Other photoinitiators are cataloged by G. Delzenne in *Industrie Cimique Belge*, 24 (1959), 739-764. Most preferred among the initiators are benzoin isobutyl ether, benzophenone, and 2-chlorothioxanthone.

The photosensitizers should be added in an amount equal to about 0.1 to about 15 percent, by weight, based upon the total ultraviolet curable system, preferably about 1 to about 5 percent.

Although not required, certain organic amines can be added to the photosensitizers above-described to further enhance the cure rate of the compositions of the instant invention in amounts up to about 500 percent, by weight, of the photosensitizer, preferably up to about 50 percent, by weight. The amines can be primary, secondary, or tertiary, and can be represented by the general formula:

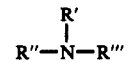

wherein R' and R" taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having 6 to about 12 ring carbon atoms; R'" has the same meaning as R' and R" with the exception that it cannot be hydrogen and that it cannot be aryl when both R' and R" are aryl. When taken together R" and R'" can be a divalent alkylene group $(C_nH_{2n})$ having from 2 to about 12 carbon atoms, a divalent alkenylene group $(C_nH_{2n-1})$ having from 3 to about 10 carbon atoms, a divalent alkadienylene group $(C_nH_{2n-2})$ having from 5 to about 10 carbon atoms, a divalent alkatrienylene group $(C_nH_{2n-3})$ having from 5 to about 10 carbon atoms, a divalent alkyleneoxyalkylene group ($C_xH_{2x}OC_xH_{2x}$) having a total of from 4 to about 12 carbon atoms, or a divalent alkyleneaminoalkylene group

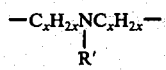

having a total of from 4 to about 12 carbon atoms. As previously indicated, the amines can be substituted with other groups; thus, the R', R" and R'" variables, whether taken singly or together, can contain one or more substituents thereon. The nature of such substitutents is generally not of significant importance and any substituent group can be present that does not exert a pronounced deterrent effect on the ultraviolet crosslinking reaction.

Illustrative of suitable organic amines one can mention are methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, dodecylamine, tridodecylamine, tri-2-chloroethylamine, di-2-bromoethylamine, methanolamine, ethanolamine, diethanolamine, triethanolamine, methyldiethanolamine, dimethylethanolamine, isopropanolamine, propanolamine, diisopropanolamine, triisopropanolamine, butylethanolamine, dihexanolamine, 2-methoxyethylamine, di-2-ethylhexylamine, tri-2-ethoxyethylamine, 2-hydroxyethyldiisopropylamine, 2-aminoethylethanolamine, allylamine, butenylamine, dihexadienylamine, cyclohexylamine, tricyclohexylamine, trimethylcyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine, phenyldimethylamine, methylphenylamine, ditolylamine, trixylyl-amine, tribenzylamine, triphenethylamine, benzyldimethylamine, benzyldihexylamine, tris-chlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4- picoline, morpholine, N-methylmorpholine, N-2-hydroxyethylmorpholine, N-2-ethoxyethylmorpholine, piperazine, N-methylpiperazine, N,N"-dimethylpiperazine, 2,2-dimethyl-1,3-bis[3-(N-morpholinyl)-propionyloxy]propane, 1,5-bis[3-(N-morpholinyl)-propionyloxy]diethyl ether, and the like. The preferred organic amines are the tertiary amines, with the alkanol amines being most preferred. The specific preferred amine activators are triethanolamine, morpholine and methyldiethanolamine.

The compositions of the instant invention after being prepared in the ratios as set out above can be applied to the material to be coated by conventional means, including brushing, spraying, dipping, curtain and roll coating techniques, and may, if desired, be dried under ambient or oven conditions to provide coating films on the substrate. The substrate can be of any composition, e.g., wood, metal, paper, plastic, fiber, ceramic, concrete, plaster, glass, etc.

Typically a mixture of the composition of the instant invention in combination with the organic photosensitizer and where utilized, the amine activator, is prepared and the composition applied to the desired substrate. It is then exposed to electromagnetic radiation having wave lengths of above about 2000 Angstrom units, preferably from about 2000 up to about 5000 Angstroms. Exposure should be from a source located about 1 to 5 inches from the coating for a time sufficient to cause crosslinking of the composition and can range from about 0.1 seconds up to about 1 min./linear ft. Generally the light radiation will have power of about 200 watts per linear inch.

The light radiation can be ultraviolet light generated from low, medium and high pressure mercury lamps. This equipment is readily available and its use is well known to those skilled in the art of radiation chemistry. Other sources include electron beam radiation, plasma arc, laser beams, etc.

In the following examples all parts and percentages are by weight, unless otherwise indicated.

EXAMPLE 1

150 ml. of n-butyl acrylate, 30 ml. of hydroxyethyl acrylate, and 50 gms. of rutile titanium dioxide were mixed into a titanium dioxide-n-butyl acrylate emulsion in a Waring blender. 300 ml. of water were added to a one liter reaction flask fitted with a condenser, thermometer and agitator. The water was heated to 70° C. 0.1 gms. of ammonium persulfate, 0.04 gms. of mercapto propionic acid and 5 ml. of water were placed in a dropping funnel, while 60 ml. of the titanium dioxide-acrylate dispersion were placed in another dropping funnel. The contents of both dropping funnels were added to the reactor over 1.5 hours with vigorous stirring, maintaining a 70° C. temperature. After completion of the reaction, the contents of the flask were then removed, placed in an equal volume of isopropanol and allowed to precipitate. The liquid was decanted and the polymeric titanium dioxide precipitate allowed to air-dry.

EXAMPLE 2

An ultraviolet curable coating composition was prepared by blending the following: 4.0 parts of the diacrylate ester of the diglycidyl ether of bisphenol A, 4.0 parts of trimethylolpropane triacrylate, 2.0 parts of n-vinyl-pyrrolidone, 0.4 parts of benzoin isobutyl ether and 10.0 parts of the titanium dioxide pigment utilized to prepare Example 1.

The above mixture was ground on a Sorvall homogenizer for 15 minutes and applied to a metal panel with a Bird fixed clearance applicator to a thickness of 0.5 to 1.0 mils.

EXAMPLE 3

Example 2 was repeated except that the titanium dioxide pigment was replaced with 7 parts of the material prepared in Example 1.

EXAMPLE 4

Examples 2 and 3 were subjected to ultraviolet light by passing the coated panel through a commercially available ultraviolet curing system equipped with a medium pressure lamp and conveyor belt. Five seconds total exposure per unit area were involved.

The cured panels were evaluated as follows:

Hardness was measured using a 25 gm. wt. on a Tukon hardness tester.

Chemical resistance was measured by determining the amount of time necessary for methylethyl ketone to lift the coating from the substrate.

After-cure adhesion was evaluated by making a cross mark in the coating with a razor blade. Pressuresensitive tape was pressed onto the cross mark and then rapidly lifted away. The adhesion is rated based on the amount of coating that is lifted with the tape, with a numerical rating on a scale of 0 to 10 being assigned. 0 reflects no adhesion and 10 reflects excellent adhesion.

| Example | Adhesion | Hardness | Chemical Resistance |
|---------|----------|----------|---------------------|
| 2 | 0-1 | 20-30 | Poor |
| 3 | 9-10 | 10-20 | Fair |

Based upon the above examples, it can be seen that by preparing the polymeric titanium dioxide systems as described herein, substantial improvements in both adhesion and chemical resistance of ultraviolet coating systems can be obtained.

What is claimed is:

1. A process for ultraviolet coating which comprises:
   a. forming an aqueous polymer emulsion of alpha beta ethylenically unsaturated vinyl polymerizable monomers utilizing a free radical initiator and up to about 20 percent, by weight, based on the solids content of the formed emulsion, of titanium dioxide;
   b. precipitating the resulting polymer emulsion utilizing an organic solvent having a boiling point of less than about 70° C;
   c. removing water and solvent from the precipitate;
   d. mixing the dried precipitate with an ultraviolet curable binder in the precipitate to binder ratio, by weight, of about 2-1 to 1-5, wherein said binder contains about 40 to about 100 percent, by weight, of an alpha beta ethylenically unsaturated vinyl polymerizable compound containing at least two sites of alpha beta ethylenic unsaturation and up to about 60 percent, by weight, of an alpha beta ethylenically unsaturated vinyl polymerizable monomer containing no more than one site of alpha beta ethylenic unsaturation, and about 0.1 to about 15 percent, by weight, based upon the ultraviolet curable components, of an ultraviolet photoinitiator;
   e. applying a coating of the ultraviolet curable mixture; and
   f. subjecting the coating to ultraviolet light.

2. The process of claim 1 wherein the titanium dioxide pigment has a particle size in the range of about 0.05 to about 10 microns.

3. The process of claim 1 wherein the polymer emulsion is prepared at temperatures ranging up to 250° F.

4. The process of claim 1 wherein the emulsion is prepared utilizing a stabilizing surfactant, which is nonionic, anionic or cationic.

5. The process of claim 4 wherein the surfactant is added at a weight range of up to about 10 percent, by weight, based on the vinyl polymerizable monomers.

6. The process of claim 1 wherein said polymer emulsion is formed in the presence of a protective colloid-forming substance.

7. The process of claim 1 wherein the organic solvent is a $C_1$-$C_5$ alcohol.

8. The process of claim 7 wherein the alcohol is propanol.

9. The process of claim 1 wherein up to about 500 percent, by weight, based upon the photoinitiator, of an organic amine is utilized.

* * * * *